United States Patent
Talty et al.

(10) Patent No.: US 9,536,364 B2
(45) Date of Patent: Jan. 3, 2017

(54) VEHICLE INTEGRATION OF BLE NODES TO ENABLE PASSIVE ENTRY AND PASSIVE START FEATURES

(71) Applicant: GM GLOBAL TECHNOLOGY OPERATIONS LLC, Detroit, MI (US)

(72) Inventors: Timothy J. Talty, Beverly Hills, MI (US); Amanda J. Kalhous, Ajax (CA); Neeraj R. Gautama, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 285 days.

(21) Appl. No.: 14/179,699

(22) Filed: Feb. 13, 2014

(65) Prior Publication Data

US 2014/0240091 A1 Aug. 28, 2014

Related U.S. Application Data

(60) Provisional application No. 61/769,107, filed on Feb. 25, 2013.

(51) Int. Cl.
*G07C 9/00* (2006.01)
*E05B 19/00* (2006.01)
*G01C 21/36* (2006.01)

(52) U.S. Cl.
CPC ....... *G07C 9/00309* (2013.01); *E05B 19/0082* (2013.01); *B60R 2325/101* (2013.01); *G01C 21/3688* (2013.01); *G07C 2009/00317* (2013.01); *G07C 2009/00365* (2013.01); *G07C 2009/00984* (2013.01); *G07C 2209/63* (2013.01)

(58) Field of Classification Search
CPC ............ G07C 2209/64; G07C 9/00309; G07C 2209/63; G07C 2009/00317; G07C 2009/00365; G07C 2009/00984; G01C 21/3688; B60R 2325/101; E05B 19/0082
USPC .................................. 340/426.16, 5.72, 5.62
See application file for complete search history.

(56) References Cited

U.S. PATENT DOCUMENTS

| | | | |
|---|---|---|---|
| 6,208,239 B1 * | 3/2001 | Muller | B60R 25/24 340/10.1 |
| 8,818,569 B2 * | 8/2014 | Oakes | B60C 23/0438 701/2 |
| 2006/0279467 A1* | 12/2006 | LeMense | H01Q 1/3241 343/711 |
| 2007/0109093 A1* | 5/2007 | Matsubara | G07C 9/00309 340/5.61 |

(Continued)

*Primary Examiner* — Thomas Alunkal
(74) *Attorney, Agent, or Firm* — John A. Miller; Miller IP Group, PLC

(57) ABSTRACT

A system and method for employing BLE nodes in a PEPS system to determine whether a FOB is within or outside of a vehicle. The method includes interrogating the FOB using a signal transmitted by a BLE device on the vehicle to determine whether the FOB is in a predetermined vicinity of the vehicle and receiving a Bluetooth signal at the BLE device that is transmitted by the FOB if the FOB is in the vicinity of the vehicle. The method also included determining a transmit power of the Bluetooth signal transmitted by the FOB and determining a receive power of the Bluetooth signal transmitted by the FOB and received by the BLE device. The method uses the transmit power and the receive power in a comparison process to determine whether the FOB is inside or outside of the vehicle.

20 Claims, 4 Drawing Sheets

(56) References Cited

U.S. PATENT DOCUMENTS

| | | | | |
|---|---|---|---|---|
| 2008/0305787 A1* | 12/2008 | Yamada | ................ | H04W 88/04 455/426.1 |
| 2009/0156126 A1* | 6/2009 | Willis | ................... | G01S 5/0226 455/41.3 |
| 2010/0075655 A1* | 3/2010 | Howarter | ............ | B60R 25/2009 455/420 |
| 2010/0191392 A1* | 7/2010 | Juzswik | ................ | B60R 25/245 701/2 |
| 2011/0086668 A1* | 4/2011 | Patel | ...................... | G08C 17/02 455/556.1 |
| 2012/0158213 A1* | 6/2012 | Talty | ....................... | B60R 25/24 701/2 |
| 2013/0288648 A1* | 10/2013 | Light | .................... | G06F 9/468 455/411 |
| 2014/0113558 A1* | 4/2014 | Varoglu | ................ | H04W 12/08 455/41.2 |
| 2014/0187219 A1* | 7/2014 | Yang | .................... | H04W 4/046 455/418 |

* cited by examiner

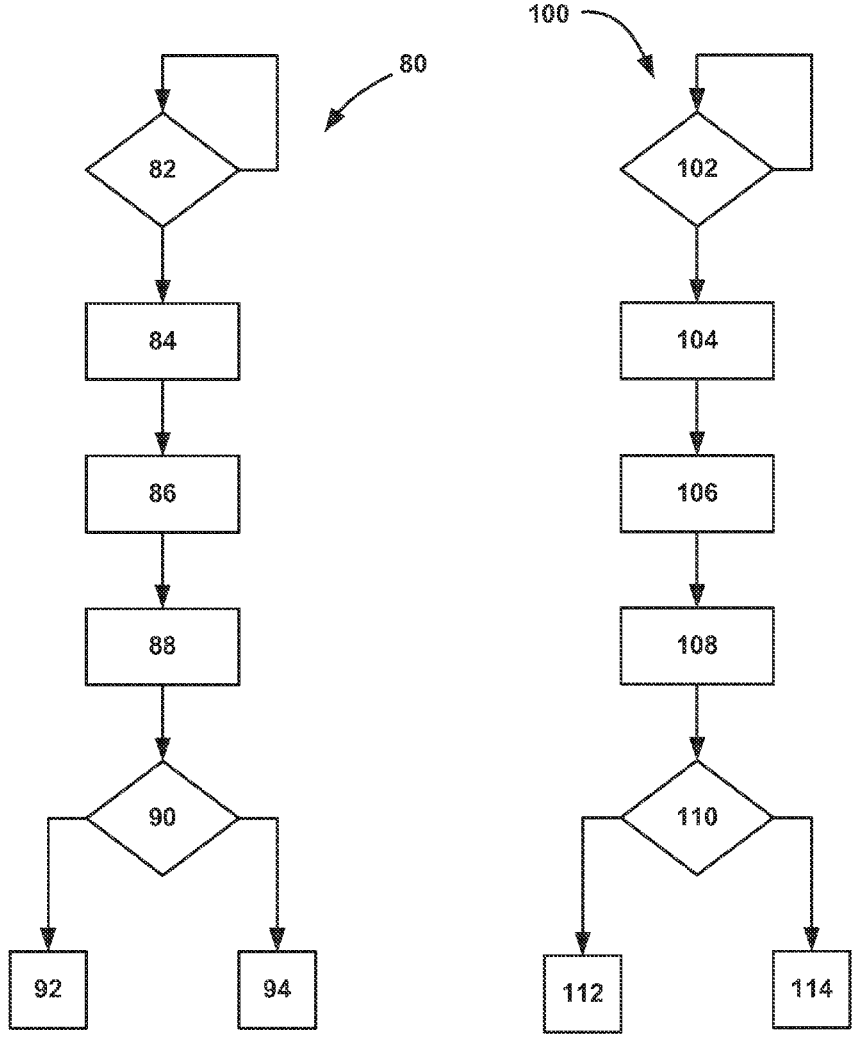

VEHICLE INTEGRATION OF BLE NODES TO ENABLE PASSIVE ENTRY AND PASSIVE START FEATURES

CROSS-REFERENCE TO RELATED APPLICATIONS

This application claims the benefit of the filing date of U.S. Provisional Application No. 61/769,107, filed Feb. 25, 2013, titled, Vehicle Integration of BLE Nodes to Enable Passive Entry and Passive Start Features.

BACKGROUND OF THE INVENTION

Field of the Invention

This invention relates generally to a passive entry and passive start (PEPS) system on a vehicle that employs a Bluetooth Low Energy (BLE) device (node) within the vehicle and, more particularly, to a PEPS system on a vehicle that employs one or more BLE nodes within the vehicle to determine whether a vehicle fob is within the vehicle or outside of the vehicle.

Discussion of the Related Art

Modern vehicles typically employ a key fob (FOB) that wirelessly transmits RF command signals to a vehicle controller to perform certain vehicle functions, such as lock the doors, unlock the doors, open the trunk, open the hatch, start the engine, turn on a security light, etc. The vehicle operator will press a particular push button on the FOB that typically has an image of the function that the button provides in order to transmit the command signal to the vehicle. The transmission is coded in such a manner that not only does the command perform a certain operation, but also protects the transmission from being recorded and resent by a third party. FOBs of this type have a limited range, and provide a convenience factor for the vehicle operator.

Modern vehicles also typically allow a vehicle driver to set various vehicle devices and systems, such as vehicle mirrors, seats, pedals, radio, etc., to a particular desirable setting, and then allow the driver to record those settings as pre-sets by activating a storing button. If the settings are changed from the last time the vehicle driver drove the vehicle, such as by another vehicle driver, then that vehicle driver can activate the pre-sets, such as by pressing the storing button or another button, so that all of the devices are returned to the desirable position for that driver. A signal transmitted from the FOB identifying the vehicle driver can be used to set the various vehicle devices and system to the pre-set conditions, where the particular FOB is unique to the vehicle driver.

As mentioned above, a typical system that allows a FOB to provide vehicle commands is activated by the vehicle driver or other authorized user using the FOB. In some vehicle designs, the vehicle performs the particular function automatically as the user approaches the vehicle, where the user is not required to actively transmit the signal. One known system, referred to as a passive entry passive start (PEPS) system, periodically interrogates or polls the area immediately around the vehicle to detect the FOB using a low frequency (LF) pulsed signal (30-300 kHz) transmitted from the vehicle at a predetermined pulse rate. The pulse width and the pulse rate of the polling signal are set based on how fast the user could be approaching the vehicle and how far from the vehicle it is desirable to first detect the user. When the FOB receives the low frequency pulsed polling signal, and authenticates it, the FOB will automatically transmit a command signal to the vehicle so that the vehicle will perform the particular function that is has been programmed to perform.

Low frequency signals are typically used for the FOB polling because they only radiate a short distance. Further, because of the short range of the low frequency pulsed polling signal, it is possible to interrogate directionally, such as at the left or right side of the vehicle or the front or rear of the vehicle. Thus, because the vehicle can know the direction of the approaching user, the vehicle need only open the door for that side.

Generating and transmitting low frequency signals typically requires a relatively large amount of current, such as on the order of about 700 mA for each pulse that is transmitted. Therefore, the amount of time that the PEPS system is able to provide the pulsed polling signal at the low frequency before the vehicle battery voltage is reduced to an unacceptable state-of-charge, below which the driver may not be able to start the vehicle, is relatively short, for example, on the order of 12-24 hours. When this time has passed since the last time the vehicle was started, the PEPS system will go into a sleep mode, and not be able to provide the polling signal.

In certain vehicle designs, because of the high energy use of the interrogation process, the system only "wakes-up" to provide the interrogation of the FOB when the user pulls on the vehicle door handle. Other designs have been proposed for a vehicle that allow a vehicle door handle to retract into the vehicle door for security purposes and upon detection of an authorized user will extend the handle to allow the driver to gain access to the vehicle. Current systems that deploy a vehicle handle from a retracted position may require about ten feet between when an authorized vehicle user is detected and when the user arrives at the vehicle to perform the operation satisfactorily. Another limitation of low frequency PEPS systems is that they require multiple low frequency antennas, such as five, which are relatively large and difficult to package.

In order to overcome this power limitation of PEPS systems, it has been proposed in the art to employ a BLE node integrated on the vehicle that is used to interrogate the FOB. Bluetooth device pairing is well understood by those trained in the art and can be accomplished by three methods, namely, 'Just Works', 'Alphanumerical Key Entry' and 'Out of Band' key exchange. In all three methods, the pairing devices exchange information including the exchange of private information that is only known to the pairing devices. This private information is used to establish connections in future encounters.

U.S. Patent Application Publication No. 2012/0158213, titled, Vehicle Data Services Enabled by Low Power FM Transmission, assigned to the assignee of this application and herein incorporated by reference, discloses a PEPS system that employs Bluetooth technology. The '213 application discloses a Bluetooth pairing process between a consumer's smart phone/consumer electronic (CE) device and a vehicle to secure the communications between the vehicle and the CE device and to determine if the CE device is an authorized device. For example, when pairing a CE device with a vehicle, the CE device and the vehicle exchange information known only to those two devices. The next time the CE device and vehicle are within the Bluetooth radio frequency range, the devices can automatically establish a Bluetooth session based on the private information that was previously shared between the devices. That is, the CE device and the vehicle exchange the private Bluetooth information over the FM frequency band. Thus, the CE device and the vehicle are able to verify/confirm that the CE device and vehicle are authorized devices. The private information can also be used to secure the data exchange between the CE device and the vehicle through encryption processes that uses the private information as an encryption key, which is well known to those trained in the art.

Employing low energy Bluetooth technology allows the vehicle to be parked for an extended period of time and still be operational to interrogate the FOB once it is within the vicinity of the vehicle. Further, since modern smart phones employ BLE technology, it is conceivable that future vehicles may not even require a FOB where the user's personal smart phone would be used instead.

One of the features of a PEPS system is to allow engine starts by pushing a button on the vehicle dashboard by an authorized user. In order to verify that the person pushing the button is an authorized user, the PEPS system must verify that the authorized FOB is within the vehicle at the time that the start button is pressed. A potential problem exists in that one authorized user may start the vehicle with the properly authorized FOB within the vehicle, such as a husband warming a vehicle for a wife on a cold day, where once the vehicle is started and the husband leaves the vehicle with the FOB, the wife may drive away the car without an authorized FOB. When this person reaches her destination and then wishes to start the car to return, she will not have the FOB to allow the vehicle start. Therefore, it is necessary that the PEPS system always knows whether the FOB is inside or outside the vehicle while it is running.

The current PEPS systems use the 125 kHz and an RSSI (received signal strength indicator) threshold to determine if the FOB is within the vehicle. Determining whether the FOB is inside or outside of the vehicle is straight forward for the low frequency PEPS system because the signal strength falls off quickly the farther the FOB is from the vehicle. Also, for the current PEPS systems, once the vehicle is running, power draw is no longer a concern and the PEPS system can continuously provide periodic interrogations of the FOB to ensure that it is still within the vehicle. However, BLE nodes operate at 2.4 GHz, which makes determining whether the FOB is within the vehicle or outside the vehicle very difficult by conventional RSSI threshold techniques. This is due to the fact that at these high frequencies, such as 2.4 GHz, the signal reflects off of various metallic objects and the RSSI fluctuates and oscillates over very short wavelengths (2-4 cm) depending on the signal reflections.

SUMMARY OF THE INVENTION

This disclosure describes a system and method for employing BLE nodes in a PEPS system to determine whether a FOB is within or outside of a vehicle. The method includes interrogating the FOB using a signal transmitted by a BLE device on the vehicle to determine whether the FOB is in a predetermined vicinity of the vehicle and receiving a Bluetooth signal at the BLE device that is transmitted by the FOB if the FOB is in the vicinity of the vehicle. The method also includes determining a transmit power of the Bluetooth signal transmitted by the FOB and determining a receive power of the Bluetooth signal transmitted by the FOB and received by the BLE device. The method uses the transmit power and the receive power in a comparison process to determine whether the FOB is inside or outside of the vehicle.

Additional features of the present invention will become apparent from the following description and appended claims, taken in conjunction with the accompanying drawings.

BRIEF DESCRIPTION OF THE DRAWINGS

FIG. 5 is a flow chart diagram showing a process for determining whether a vehicle FOB is within the vehicle for a PEPS system that includes a BLE node integrated within the vehicle door;

FIG. 6 is a flow chart diagram showing a process for determining whether a vehicle FOB is within the vehicle for a PEPS system that includes a BLE node integrated within the vehicle door and a reference BLE node integrated elsewhere in the vehicle.

DETAILED DESCRIPTION OF THE EMBODIMENTS

The following discussion of the embodiments of the invention directed to a system and method for determining whether a vehicle FOB is within the vehicle in a PEPS system that employs Bluetooth low energy technology is merely exemplary in nature, and is in no way intended to limit the invention or its applications or uses.

Figure 1:
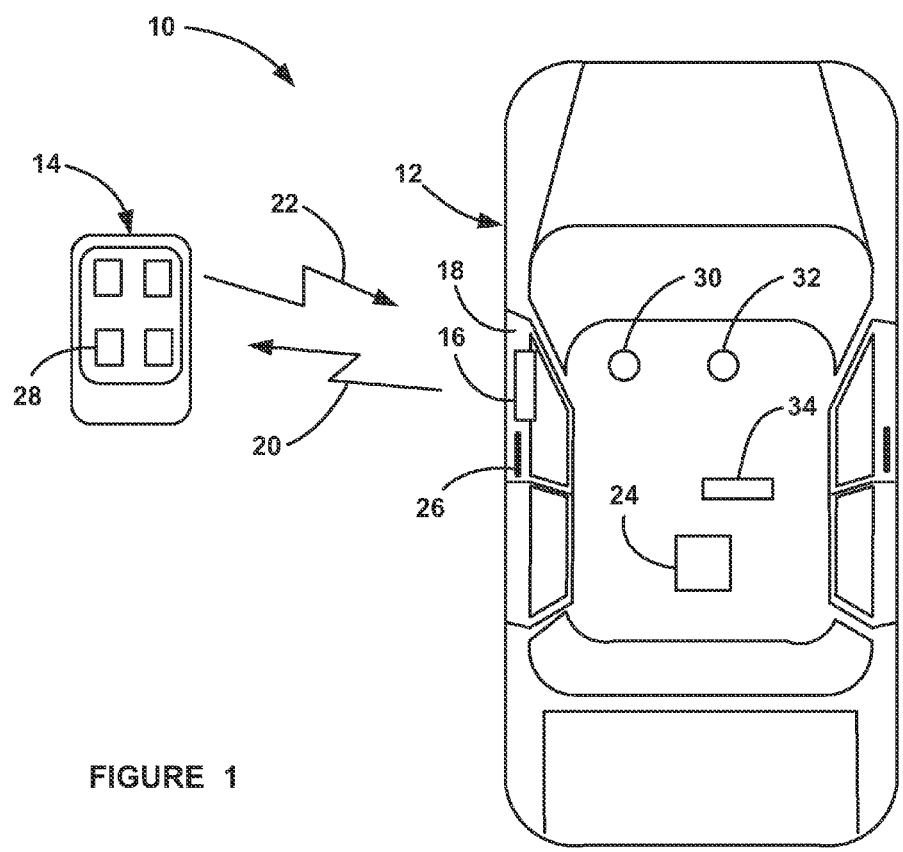
FIG. 1 is an illustration of a PEPS system on a vehicle that employs a BLE node.

FIG. 1 is an illustration of a PEPS system 10 for a vehicle 12 that includes a FOB 14, which is intended to generally represent any CE device that can be carried by an authorized user of the vehicle 12. The PEPS system 10 includes a primary BLE node 16 positioned within a driver side door 18 at a particular location therein that provides the desired attenuation of the low energy Bluetooth signals being received by the node 16 depending on whether the FOB 14 is outside of the vehicle 12 or within the vehicle 12 consistent with the discussion herein. As discussed, the BLE node 16 generates a low energy Bluetooth interrogation signal 20 that is received by the FOB 14 when the FOB 14 is within some predefined distance of the vehicle 12. It is noted that the present invention is specific to BLE nodes that employ Bluetooth low energy technologies and not conventional Bluetooth technology that may not be low in energy. It is further noted that the high frequency of a Bluetooth signal requires relatively small antennas.

If the signal 20 received by the FOB 14 is recognized by the FOB 14, the FOB 14 will transmit a return low energy Bluetooth signal 22 that is received by the BLE node 16, which will then decode the signal 22 to verify that the FOB 14 is authorized. The BLE node 16 is in communication with various control modules on the vehicle 12, such as a body control module (BCM) 24, that may be programmed to perform certain operations in response to the BLE node 16 receiving the valid signal 22 from the authorized FOB 14. Non-limiting examples include moving the vehicle seat and mirrors to a pre-set position for the particular FOB 14, turning on security lights external to the vehicle 12, extending a vehicle door handle 26 to allow the vehicle driver to open the door 18, etc. Further, the FOB 14 may include various manual buttons 28 that when pressed by the vehicle operator can perform other vehicle operations, such as opening a vehicle trunk, lift gate, etc.

In certain vehicle designs, an ignition key is not required to start the vehicle 12. In these types of vehicle designs, once the BLE node 16 verifies that the FOB 14 is authorized, and verifies that the FOB 14 is inside the vehicle 12, the BCM 24 will allow the vehicle 12 to be started by pressing a start button 30. The present invention proposes a technique for allowing the BLE node 16 to accurately and consistently determine whether the FOB 14 is outside or inside the vehicle 12 to allow the vehicle 12 to be started by the push button 30, and also to provide some type of warning signal, such as by using a warning light 32, that the FOB 14 has left the vehicle 12 after it has been started. The PEPS system 10 also includes a secondary BLE node 34 provided at a suitable location on the vehicle 12 that operates in conjunction with the BLE node 16 to determine whether the FOB 14 is within the vehicle 12, as will be discussed below.

The present invention proposes using a step change of signal loss based on electromagnetic propagation modes to effectively determine when the FOB 14 transitions from inside the vehicle 12 to outside of the vehicle 12. By placing the primary BLE node 16 within the sheet metal of the door 18 at a calculated position relative to the door glass, a step change in the effective path loss of the signal 22 transmitted by the FOB 14 and received by the BLE node 16 can be easily detected over a very small distance, such as a few centimeters. In one embodiment, the propagation mode is determined by a knife edge diffraction propagation model when the FOB 14 is outside of the vehicle 12 and the propagation mode is determined by a two ray propagation model when the FOB 14 is inside of the vehicle 12.

Figure 2:
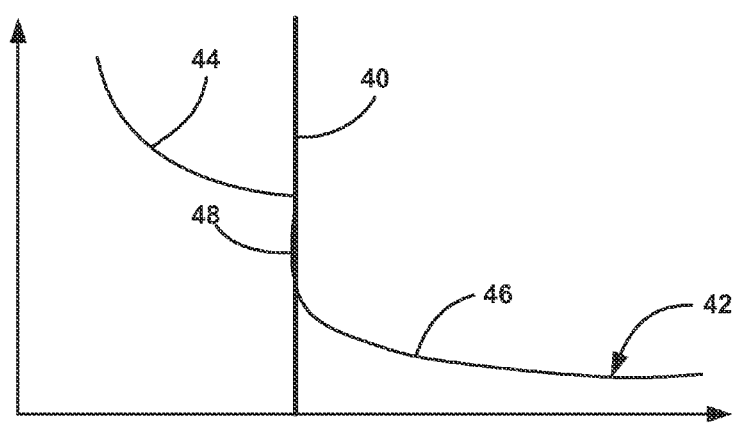
FIG. 2 is a graph with distance on the horizontal axis and effective path loss on the vertical axis showing the effective path loss within a vehicle and outside of a vehicle for a signal transmitted by the FOB and received by a BLE node on the vehicle.

FIG. 2 is a graph with distance on the horizontal axis and effective path loss (PLE) on the vertical axis showing the effective path loss of the signal 22 as it propagates from the FOB 14 and is received by the BLE node 16 integrated within the vehicle door 18 to illustrate this signal loss. Line 40 represents the vehicle door 18, where the left side of the line 40 shows the effective path loss of the signal 22 when the FOB 14 is outside of the vehicle 12 and the right side of the line 40 shows the effective path loss of the signal 22 when the FOB 14 is inside of the vehicle 12. Particularly, an effective path loss graph line 42 shows the effective path loss of the signal 22 transmitted from the FOB 14 and received by the BLE node 16, where portion 44 of the graph line 42 shows the effective path loss when the FOB 14 is outside of the vehicle 12, which decreases as the FOB 14 approaches the vehicle door 18, and portion 46 of the graph line 42 shows the effective path loss when the FOB 14 is within the vehicle 12, which slightly decreases as the FOB 14 moves away from the vehicle door 18. Portion 48 of the graph line 42 identifies a decision area where the PEPS system 10 determines when the FOB 14 moves from inside to outside of the vehicle 12, or vice versa, as the electromagnetic propagation modes of the signal 22 change.

Figure 3:
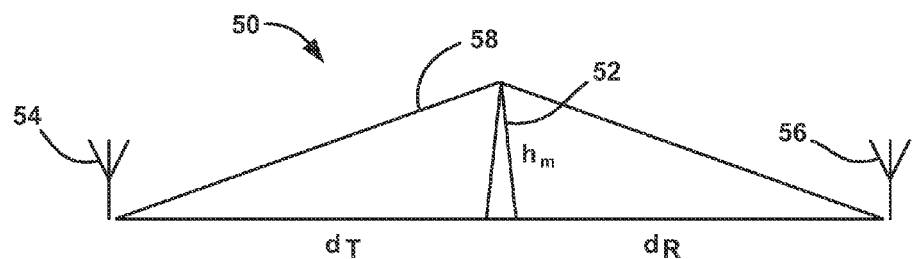
FIG. 3 is an illustration of a knife edge diffraction propagation model of a Bluetooth signal transmitted by the FOB and received by the BLE node positioned within a vehicle door for when the FOB is outside the vehicle.

FIG. 3 is an illustration 50 of the knife edge diffraction propagation model depicting a knife edge 52 representing the vehicle door 18. An antenna 54 represents the FOB 14 and is positioned at one side of the knife edge 52, where $d_T$ is the distance between the antenna 54 and the knife edge 52, and an antenna 56 represents the BLE node 16 at the other side of the knife edge 52, where $d_R$ is the distance between the antenna 56 and the knife edge 52. Line 58 shows the signal path between the antennas 54 and 56. Equations (1) and (2) below show the signal strength intensity for this model.

$$A_{diff} = \begin{cases} 0 & v < 0 \\ 6 + 9v - 1.27v^2 & 0 < v < 2.4 \\ 13 + \log_{10} v & v > 2.4 \end{cases} \quad (1)$$

$$v = h_m \sqrt{\left(\frac{2}{\lambda}\right)\left(\frac{1}{d_t} + \frac{1}{d_r}\right)} \quad (2)$$

Figure 4:
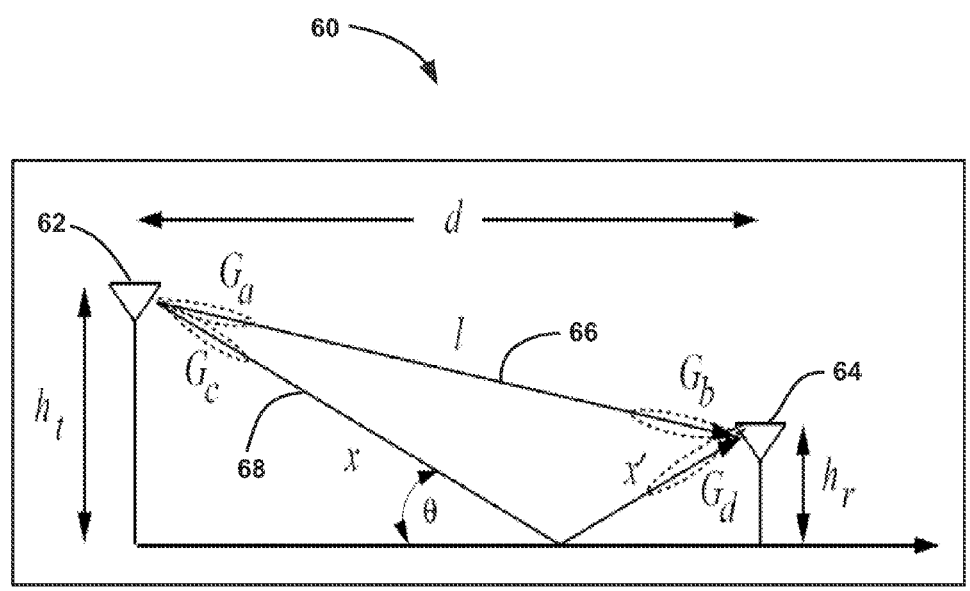
FIG. 4 is an illustration of a two ray propagation model of a Bluetooth signal transmitted by the FOB and received by the BLE node positioned in a vehicle door for when the FOB is within the vehicle.

If the FOB 14 is inside of the vehicle 12 with the BLE node 16 in the vehicle door, then the two ray propagation model can be employed to identify the signal strength of the signal 22. FIG. 4 is an illustration 60 of the two ray propagation model including a transmitting antenna 62 and a receiving antenna 64. Line 66 represents a direct path from the antenna 62 to the antenna 64 and line 68 represents a reflected path from the antenna 62 to the antenna 64. Equation (3) below shows the signal strength intensity for this model.

$$P_r \approx \left[\frac{\lambda \sqrt{G_1}}{4\pi d}\right]^2 \left[\frac{4\pi h_t h_r}{\lambda d}\right]^2 P_t \quad (3)$$

Based on these propagation models and the BLE node 16 being within the door 18, the present invention proposes a strategy for using the knife edge diffraction propagation model that provides a high signal loss and the two ray propagation model that provides a low signal loss to allow the PEPS system 10 to readily identify when the FOB 14 transitions from inside the vehicle 12 to outside the vehicle 12 or outside the vehicle 12 to inside the vehicle 12. The present invention proposes three embodiments for determining whether the FOB 14 is within the vehicle 12 or outside the vehicle 12 based on the discussion above. In the first embodiment, the PEPS system 10 only uses the primary BLE node 16. In the second embodiment, the PEPS system 10 uses the primary BLE node 16 and the secondary BLE node 34. In this embodiment, the secondary BLE node 34 transmits a Bluetooth signal that is used as a reference signal to compare the signal path loss for the FOB 14 and the secondary BLE node 34, where the signal strength of the reference signal is from inside of the vehicle 12. In the third embodiment, the PEPS system 10 also uses the primary BLE node 16 and the secondary BLE node 34. In this embodiment, however, the secondary BLE node 34 acts as a second receiver and is used to compare the path loss between the nodes 16 and 34. No system calibration is required for this embodiment.

FIG. 5 is a flow chart diagram 80 showing a process for determining the location of the FOB 14 using only the BLE node 16. At decision diamond 82, the PEPS algorithm running in the BCM 24 periodically determines whether the FOB 14 has been detected, and if not, returns to the decision diamond 82 to determine whether the FOB 14 has been detected at the next sample time. If the FOB 14 has been detected at the decision diamond 82, the algorithm determines the transmit power of the FOB 14 at box 84, which would be a known value calibrated into the PEPS system 10. The algorithm then determines the power (signal strength) of the Bluetooth signal transmitted by the FOB 14 and received by the BLE node 16 at box 86. The algorithm then calculates the effective path loss of the received signal at box 88 as the difference between the received signal power and the transmitted signal power. The algorithm then determines whether the effective path loss is greater than a predetermined threshold at decision diamond 90, which is a calibration value determined during PEPS system development. If the effective path loss is greater than the threshold at the decision diamond 90, meaning the loss of the signal 22 is high, then the algorithm determines that the FOB 14 is outside the vehicle 12 at box 92. Contrary, if the algorithm determines that the effective path loss is not greater than the threshold at the decision diamond 90, meaning the loss of the signal 22 is low, then the algorithm determines that the FOB 14 is inside the vehicle 12 at box 94.

FIG. 6 is a flow chart diagram 100 showing a process for implementing the second embodiment. As above, the algorithm determines whether the FOB 14 is detected at decision diamond 102, and if so, determines the transmit power of both the signal transmitted by the FOB 14 and the transmit power of the signal transmitted by the secondary BLE node 34 at box 104. Likewise, the algorithm also determines the power of the signal received from the FOB 14 and the power of the signal received from the secondary BLE node 34 by the primary BLE node 16 at box 106. The algorithm then calculates the effective path loss for both the signal transmitted by the FOB 14 and the signal transmitted by the secondary BLE node 34 as the difference between the receive power and the transmit power of the signal transmitted by the FOB 14 and the signal transmitted by the BLE node 34 at box 108. The algorithm then determines if the effective path loss of the signal transmitted by the FOB 14 is greater than the effective path loss of the signal transmitted by the secondary BLE node 34 at decision diamond 110, and if so, determines that the FOB 14 is outside of the vehicle 12 at box 112 because the effective path loss of the signal transmitted by the FOB 14 would be considerable higher than the effective path loss of the signal transmitted by the BLE node 34 if the BLE node 16 is in the door 18, the FOB 14 is outside of the metal skin of the door 18 and the BLE node 34 is within the vehicle and inside the metal skin of the door 18. Otherwise, the algorithm determines that the FOB 14 is inside the vehicle 12 at box 114.

Figure 7:
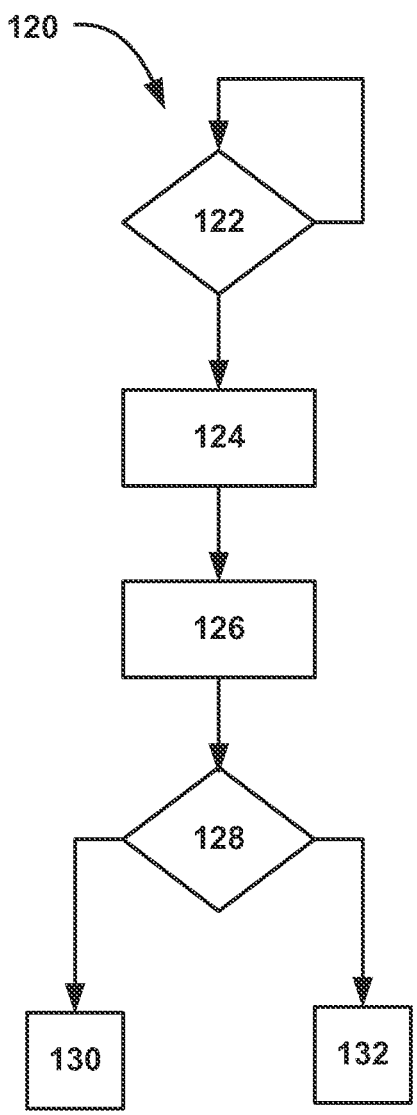
FIG. 7 is a flow chart diagram showing a process for determining whether a vehicle FOB is within the vehicle for a PEPS system that includes a BLE node integrated within the vehicle door and a receiver BLE node integrated elsewhere in the vehicle.

FIG. 7 is a flow chart diagram 120 showing a process for implementing the third embodiment. As above, the algorithm determines whether the FOB 14 is detected at decision diamond 122, and if so, determines the transmit power of the signal transmitted by the FOB 14 at the primary BLE node 16 in the door at box 124 and determines the transmit power of the FOB 14 at the secondary BLE node 34 at box 126. The primary BLE node 16 is installed on the vehicle door 18 in such a manner to provide limited/no signal blockage to the signal from the FOB 14 when the FOB 14 is located outside the vehicle 12. As an example, the primary BLE node 16 could be packaged in the exterior door handle 26 or in exterior body trim. This will result in a higher signal level received from the FOB 14 by the primary BLE node 16 when the FOB 14 is outside the vehicle 12. Similarly, when primary BLE node 16 is packaged in such a fashion, the signal level will be lower between the FOB 14 and the primary BLE node 16 when the FOB 14 is inside the vehicle 12. Thus, the algorithm determines if the transmit power received at the primary BLE node 16 is greater than the transmit power received at the secondary BLE 34 at decision diamond 128, and if so, determines that the FOB 14 is outside of the vehicle 12 at box 130. If not, the algorithm determines that the FOB 14 is inside the vehicle 12 at box 132.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether a vehicle FOB is located within the vehicle or outside of the vehicle, said method comprising:
   providing a primary Bluetooth Low Energy (BLE) device on the vehicle;
   interrogating the FOB using a signal transmitted by the primary BLE device to determine whether the FOB is in a predetermined vicinity of the vehicle;
   receiving a Bluetooth signal at the primary BLE device that is transmitted by the FOB if the FOB is in the vicinity of the vehicle;
   determining a receive power of the Bluetooth signal transmitted by the FOB and received by the BLE device in the primary BLE device; and
   using the receive power in a comparison process in the primary BLE device to determine whether the FOB is inside or outside of the vehicle.

2. The method according to claim 1 wherein providing a primary BLE device includes providing the primary BLE device within a door of the vehicle.

3. The method according to claim 2 wherein providing the primary BLE device includes providing the primary BLE device in a driver side door of the vehicle.

4. The method according to claim 1 further comprising determining a transmit power of the Bluetooth signal transmitted by the FOB, wherein using the receive power in a comparison process to determine whether the FOB is inside or outside of the vehicle includes using the transmit power and the receive power in a comparison process to determine whether the FOB is inside or outside of the vehicle.

5. The method according to claim 4 wherein using the transmit power and the receive power in a comparison process to determine whether the FOB is inside or outside of the vehicle includes providing a difference between the receive power and the transmit power, comparing the difference between the receive power and the transmit power to a predetermined threshold value, determining that the FOB is outside of the vehicle if the difference is greater than the threshold, and determining that the FOB is inside the vehicle if the difference is less than the threshold.

6. The method according to claim 1 further comprising providing a secondary BLE device on the vehicle, receiving a Bluetooth signal by the primary BLE device that is transmitted by the secondary BLE device, determining a transmit power of the Bluetooth signal transmitted by the secondary BLE device, and determining a receive power of the Bluetooth signal transmitted by the secondary BLE device and received by the primary BLE device.

7. The method according to claim 6 wherein using the transmit power and the receive power in a comparison process to determine whether the FOB is inside or outside of the vehicle includes providing a first difference between the receive power and the transmit power of the FOB, providing a second difference between the receive power and the transmit power of the secondary BLE device, comparing the first difference and the second difference, determining that the FOB is outside of the vehicle if the first difference is greater than the second difference, and determining that the FOB is inside the vehicle if the first difference is less than the second difference.

8. The method according to claim 1 further comprising providing a secondary BLE device on the vehicle, receiving a Bluetooth signal at the secondary BLE device that is transmitted by the FOB, determining a receive power of the Bluetooth signal transmitted by the FOB and received by the secondary BLE device, and using the receive power at the primary and secondary BLE devices in a comparison process to determine whether the FOB is inside or outside of the vehicle.

9. The method according to claim 1 wherein using the transmit power and the receive power in a comparison process to determine whether the FOB is inside or outside of the vehicle includes using an effective signal path loss of the Bluetooth signal that is transmitted by the FOB as determined by a knife edge diffraction propagation model and two ray propagation model.

10. The method according to claim 1 wherein the vehicle FOB is a smart phone.

11. The method according to claim 1 further comprising allowing the vehicle to be started if it is determined that the FOB is within the vehicle.

12. The method according to claim 11 further comprising providing a warning if the vehicle is started and the FOB exits the vehicle.

13. A method for determining whether a vehicle FOB is located within the vehicle or outside of the vehicle, said method comprising:
providing a primary Bluetooth Low Energy (BLE) device in a driver side door of the vehicle;
interrogating the FOB using a signal transmitted by the primary BLE device to determine whether the FOB is in a predetermined vicinity of the vehicle;
receiving a Bluetooth signal at the primary BLE device that is transmitted by the FOB if the FOB is in the vicinity of the vehicle;
determining a transmit power of the Bluetooth signal transmitted by the FOB in the primary BLE device;
determining a receive power of the Bluetooth signal transmitted by the FOB and received by the BLE device in the primary BLE device;
providing a difference between the receive power and the transmit power in the primary BLE device;
comparing the difference between the receive power and the transmit power in the primary BLE device to a predetermined threshold value;

determining that the FOB is outside of the vehicle if the difference is greater than the threshold; and
determining that the FOB is inside the vehicle if the difference is greater less the threshold.

14. The method according to claim 13 wherein using the transmit power and the receive power in a comparison process to determine whether the FOB is inside or outside of the vehicle includes using an effective signal path loss of the Bluetooth signal that is transmitted by the FOB as determined by a knife edge diffraction propagation model and two ray propagation model.

15. The method according to claim 13 wherein the vehicle FOB is a smart phone.

16. The method according to claim 13 further comprising allowing the vehicle to be started if it is determined that the FOB is within the vehicle.

17. A method for determining whether a vehicle FOB is located within the vehicle or outside of the vehicle, said method comprising:
providing a primary Bluetooth Low Energy (BLE) device in a driver side door of the vehicle;
providing a secondary BLE device on the vehicle;
interrogating the FOB using a signal transmitted by the primary BLE device to determine whether the FOB is in a predetermined vicinity of the vehicle;
receiving a Bluetooth signal at the primary BLE device that is transmitted by the FOB if the FOB is in the vicinity of the vehicle;
receiving a Bluetooth signal at the primary BLE device that is transmitted by the secondary BLE device;
determining a transmit power of the Bluetooth signal transmitted by the FOB;
determining a transmit power of the Bluetooth signal transmitted by the secondary BLE device;
determining a receive power of the Bluetooth signal transmitted by the FOB and received by the primary BLE device;
determining a receive power of the Bluetooth signal transmitted by the secondary BLE device and received by the primary BLE device;
providing a first difference between the receive power and the transmit power of the Bluetooth signal from the FOB;
providing a second difference between the receive power and the transmit power of the Bluetooth signal from the secondary BLE device;
comparing the first difference and the second difference;
determining that the FOB is outside of the vehicle if the first difference is greater than the second difference; and
determining that the FOB is inside the vehicle if the first difference is less than the second difference.

18. The method according to claim 17 wherein using the transmit power and the receive power in a comparison process to determine whether the FOB is inside or outside of the vehicle includes using an effective signal path loss of the Bluetooth signal that is transmitted by the FOB as determined by a knife edge diffraction propagation model and two ray propagation model.

19. The method according to claim 17 further comprising allowing the vehicle to be started if it is determined that the FOB is within the vehicle.

20. The method according to claim 17 further comprising providing a warning if the vehicle is started and the FOB exits the vehicle.

* * * * *